US011433814B2

(12) United States Patent
Baur

(10) Patent No.: US 11,433,814 B2
(45) Date of Patent: Sep. 6, 2022

(54) PROCESS FOR MANUFACTURING A PLURALITY OF EC MIRROR CELLS USING GLASS SHEET FOR MULTIPLE FRONT SUBSTRATES

(71) Applicant: Magna Mirrors of America, Inc., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 17/249,186

(22) Filed: Feb. 23, 2021

(65) Prior Publication Data
US 2021/0261057 A1 Aug. 26, 2021

Related U.S. Application Data

(60) Provisional application No. 62/980,461, filed on Feb. 24, 2020.

(51) Int. Cl.
*B60R 1/08* (2006.01)
*B60R 1/04* (2006.01)
*C03C 27/06* (2006.01)
*C03C 17/36* (2006.01)

(52) U.S. Cl.
CPC ............... *B60R 1/088* (2013.01); *B60R 1/04* (2013.01); *C03C 17/3644* (2013.01); *C03C 17/3649* (2013.01); *C03C 17/3663* (2013.01); *C03C 27/06* (2013.01); *C03C 2217/252* (2013.01); *C03C 2217/256* (2013.01); *C03C 2217/26* (2013.01); *C03C 2217/948* (2013.01)

(58) Field of Classification Search
CPC ....... B60R 1/088; B60R 1/04; C03C 17/3644; C03C 17/3649; C03C 17/3663; C03C 27/06; C03C 2217/252; C03C 2217/26; C03C 2217/948; C03C 17/00
See application file for complete search history.

(56) References Cited

U.S. PATENT DOCUMENTS

| 4,712,879 | A | 12/1987 | Lynam et al. |
| 5,066,112 | A | 11/1991 | Lynam et al. |
| 5,073,012 | A | 12/1991 | Lynam |
| 5,076,673 | A | 12/1991 | Lynam et al. |
| 5,115,346 | A | 5/1992 | Lynam |
| 5,140,455 | A | 8/1992 | Varaprasad et al. |

(Continued)

*Primary Examiner* — Sath V Perungavoor
*Assistant Examiner* — Tyler B Edwards
(74) *Attorney, Agent, or Firm* — Honigman LLP

(57) ABSTRACT

A method of manufacturing a variable reflectance mirror reflective element suitable for use in a vehicular rearview mirror assembly includes providing a front glass sheet and a plurality of rear glass substrates, and joining and spacing the rear glass substrates at the front glass sheet via perimeter seals. After the rear glass substrates are joined with the front glass sheet, the front glass sheet is cut to form a plurality of front glass substrates. A back plate is attached at the rear side of each of the rear glass substrates. After cutting the front glass sheet, the back plate of the respective rear glass substrate and cut front glass substrate portion is fixtured at a finishing tool, which processes the cut edges of at least the respective front glass substrate to provide a finished perimeter edge of the front glass substrate to form a variable reflectance mirror reflective element.

27 Claims, 7 Drawing Sheets

(56) References Cited

U.S. PATENT DOCUMENTS

| | | |
|---|---|---|
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,910,854 A | 6/1999 | Varaprasad et al. |
| 6,002,511 A | 12/1999 | Varaprasad et al. |
| 6,154,306 A | 11/2000 | Varaprasad et al. |
| 6,178,034 B1 | 1/2001 | Allemand et al. |
| 6,329,925 B1 | 12/2001 | Skiver et al. |
| 6,449,082 B1 | 9/2002 | Agrawal et al. |
| 6,595,649 B2 | 7/2003 | Hoekstra et al. |
| 6,648,477 B2 | 11/2003 | Hutzel et al. |
| 6,690,268 B2 | 2/2004 | Schofield et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,360,932 B2 | 4/2008 | Uken et al. |
| 7,626,749 B2 | 12/2009 | Baur et al. |
| 7,855,755 B2 | 12/2010 | Weller et al. |
| 8,049,640 B2 | 11/2011 | Uken et al. |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 9,346,403 B2 | 5/2016 | Uken et al. |
| 9,598,016 B2 | 3/2017 | Blank et al. |
| 2006/0007550 A1* | 1/2006 | Tonar ............... B60R 1/088 359/604 |
| 2006/0061008 A1 | 3/2006 | Kamer et al. |
| 2014/0313563 A1 | 10/2014 | Uken et al. |
| 2015/0097955 A1 | 4/2015 | De Wind et al. |
| 2015/0140146 A1* | 5/2015 | Habibi ............... G02F 1/161 425/127 |
| 2020/0269760 A1* | 8/2020 | De Wind ......... G02F 1/13338 |
| 2021/0146840 A1* | 5/2021 | Habibi ............... G02F 1/161 |

* cited by examiner

PROCESS FOR MANUFACTURING A PLURALITY OF EC MIRROR CELLS USING GLASS SHEET FOR MULTIPLE FRONT SUBSTRATES

CROSS REFERENCE TO RELATED APPLICATION

The present application claims the filing benefits of U.S. provisional application Ser. No. 62/980,461, filed Feb. 24, 2020, which is hereby incorporated herein by reference in its entirety.

FIELD OF THE INVENTION

The present invention relates generally to the field of interior rearview mirror assemblies for vehicles and more specifically to a process for manufacturing interior rearview mirror assemblies for vehicles.

BACKGROUND OF THE INVENTION

It is known to provide a mirror assembly that is adjustably mounted to an interior portion of a vehicle, such as via a ball pivot or joint mounting configuration, where the mirror casing and reflective element are adjusted relative to the interior portion of a vehicle by pivotal movement about the ball pivot configuration. The mirror casing and reflective element are pivotable about the ball pivot joint by a user that is adjusting a rearward field of view of the reflective element. The mirror reflective element often comprises an electrochromic reflective element having a front glass substrate and a rear glass substrate with an electrochromic medium sandwiched between the front and rear glass substrates.

SUMMARY OF THE INVENTION

The present invention provides a process for forming an electro-optic mirror reflective element for a vehicular interior or exterior rearview mirror assembly, with the front glass substrates of the mirror reflective elements formed from a glass sheet that is not cut to form the front glass substrates until after the rear glass substrates are adhered to the glass sheet. The back plate may also be attached at the rear glass substrates before the front glass substrates are formed or cut from the glass sheet. The interpane cavities of the cells may be filled before or after the front glass substrates are formed or cut from the glass sheet. The cut edges of the formed or cut front glass substrates are thus finished (e.g., ground and/or polished) after the cells are formed. By attaching the back plates at the rear glass substrates before the front glass substrates are formed or cut from the glass sheet (and optionally before the rear glass substrates are mated with the front glass sheet), the back plates can be used to fixture the substrates and sheet at the cutting tool and may be used to fixture the mirror cells at the finishing tool, thereby providing enhanced accurate and secure fixturing of the cells during the cutting process and the edge finishing process.

These and other objects, advantages, purposes and features of the present invention will become apparent upon review of the following specification in conjunction with the drawings.

DESCRIPTION OF THE PREFERRED EMBODIMENTS

Figure 1:
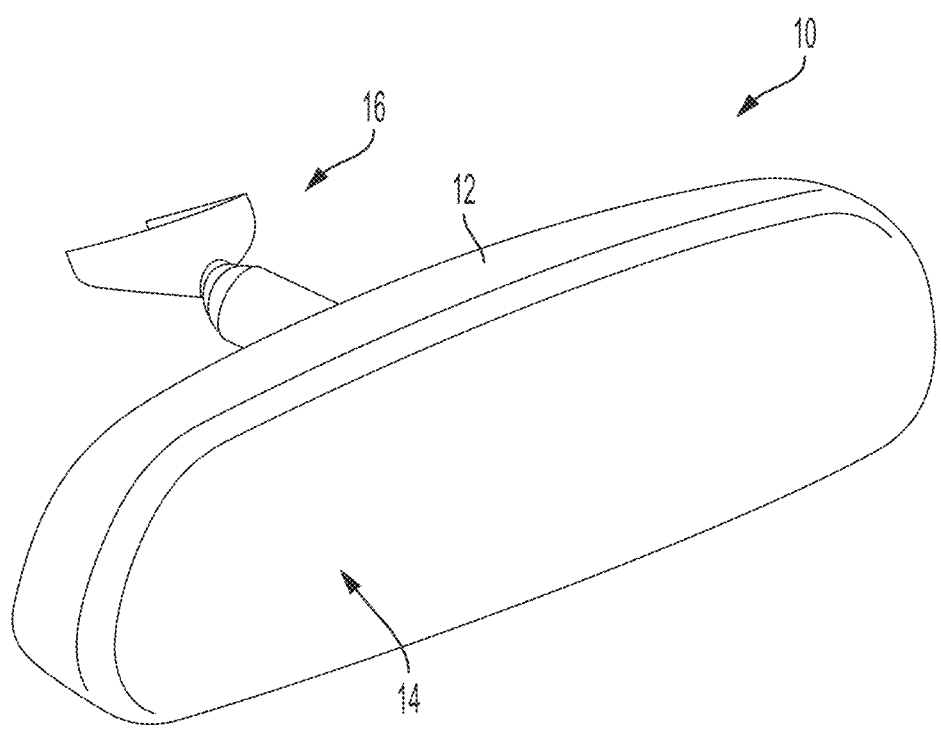
FIG. 1 is a perspective view of a frameless interior rearview mirror assembly formed via the process described herein.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers at the glass substrates of the reflective element. Although shown as an interior rearview mirror assembly, aspects of the process described below are also suitable for use in manufacturing a mirror reflective element assembly for an exterior rearview mirror assembly. The glass sheets and/or substrates may be formed as flat or planar sheets/substrates, or the front glass sheet may be curved or non-planar and the rear glass sheet or substrates may be correspondingly curved to form curved or non-planar or non-unit magnification exterior mirror reflective elements.

Figure 2:
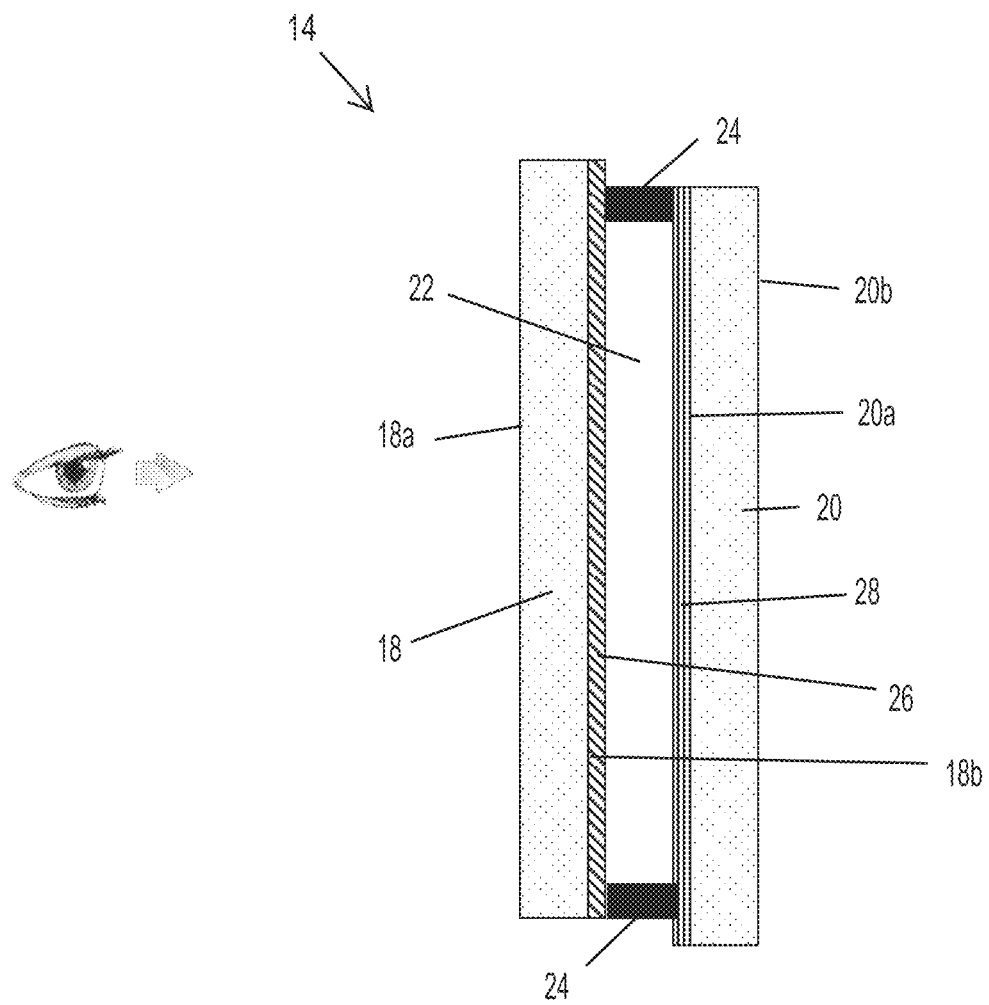
FIG. 2 is a sectional view of a mirror reflective element having offset glass substrates.

In the illustrated embodiment, and as shown in FIG. 2, the mirror reflective element 14 or mirror cell comprises a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. As shown in FIG. 2, front substrate 18 has a front or first surface 18a (the surface that generally faces the driver of a vehicle when the mirror assembly is normally mounted at the vehicle) and a rear or second surface 18b opposite the front surface 18a, and rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element. The second surface 18b has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like), while the third surface 20a has a metallic reflector coating 28 (or multiple layers or coatings) established thereat. The front or third surface 20a of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers. The mirror reflector coating 28 may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface 20a of the rear substrate 20 (commonly referred to as the third surface of the reflective element) and opposing the electro-optic medium 22, such as an electrochromic medium disposed between the front and rear substrates and bounded by the perimeter seal 24 (but optionally, the mirror reflector coating could be disposed at the rear surface 20b of the rear substrate 20 (commonly referred to as the fourth surface of the reflective element), while remaining within the spirit and scope of the present invention).

The third surface 20a defines the active EC area or surface of the rear substrate within the perimeter seal 24. The coated third surface 20a may also be coated to define a tab-out region for providing electrical connection of the conductive layers to an electrical clip of a connector or bus-bar, such as the types described in U.S. Pat. Nos. 5,066,112 and 6,449,082, which are hereby incorporated herein by reference in their entireties.

Electro-optic (such as electrochromic) mirror reflective elements (for either interior or exterior rearview mirrors) comprise glass substrates that are produced from coated sheets or blanks of glass that are subsequently turned into shapes or substrates or that are produced from shapes or substrates that are subsequently (after the shapes are formed) coated with one or more layers of electrically conductive and/or metallic reflector coatings. The coated shapes are then sequenced through numerous process steps to create a functioning EC mirror reflective element.

Figure 3:
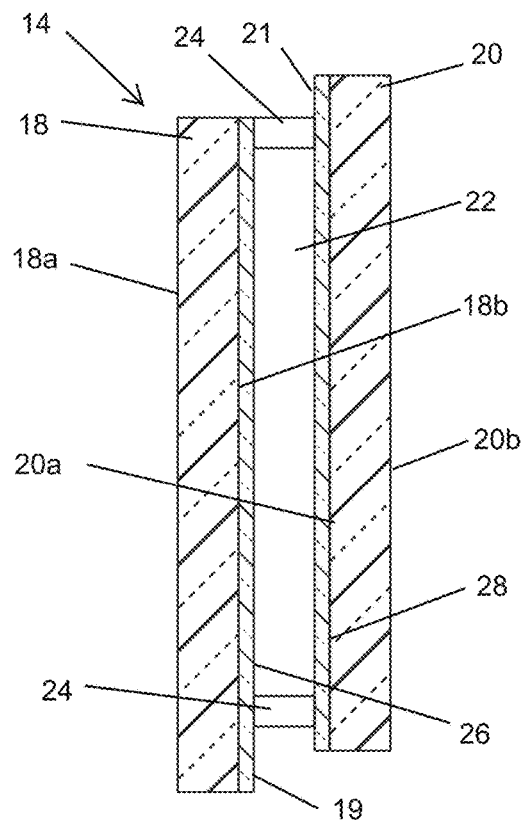
FIG. 3 is another sectional view of the mirror reflective element having offset glass substrates.

Typically, the product is produced as a framed product that utilizes a double offset design, with one glass substrate offset from the other glass substrate to provide an offset region for electrically connecting the electrically conductive coating of one of the glass substrates to the anode (such as at the offset or overhang region 21 at the third surface of the rear substrate) of the mirror cell, and another glass substrate offset region for electrically connecting the electrically conductive coating of the other glass substrate to the cathode (such as at the offset or overhang region 19 at the second surface of the front substrate) of the mirror cell (see FIGS. 2 and 3) to provide electrical charge to the one or more electrically conductive layers at the glass substrates. The reflective element or cell is housed within a plastic bezel to conceal the offset and the perimeter seal.

Figure 4:
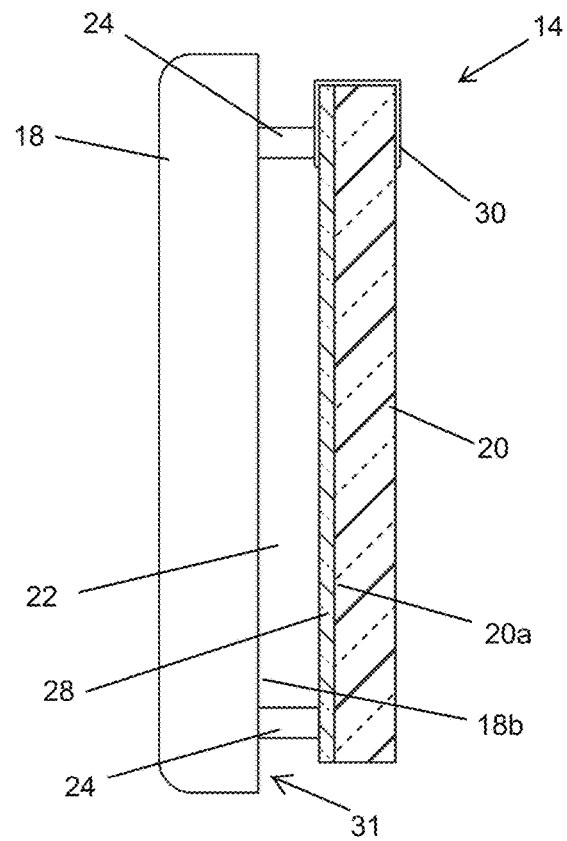
FIG. 4 is a sectional view of a mirror reflective element for a frameless rearview mirror assembly.

With the advent of frameless mirrors (where the outer perimeter edge portion of the front substrate is exposed and not "framed" by a plastic bezel), the offsets used for electrical connection to the cathode (at the front substrate) are now different. For a typical frameless mirror (see the mirror cell 14 of FIG. 4), the rear glass substrate 20 is smaller (has smaller cross dimensions) than the front glass substrate 18. Electrical connections for the anode and the cathode are provided either via a wrapped conductor 30 at the rear substrate 20 or through isolation of the conductor at the second surface 18b and/or third surface 20a of the substrates. For example, and with reference to FIG. 4, the anode may electrically connect at a fourth surface portion of a wrap-around conductor 30 that wraps around a perimeter edge portion of the rear substrate so as to electrically connect the fourth surface portion to the third surface electrically conductive metallic reflector, while the cathode may electrically connect at the second surface electrically conductive transparent coating at the overhang region 31.

Figure 5:
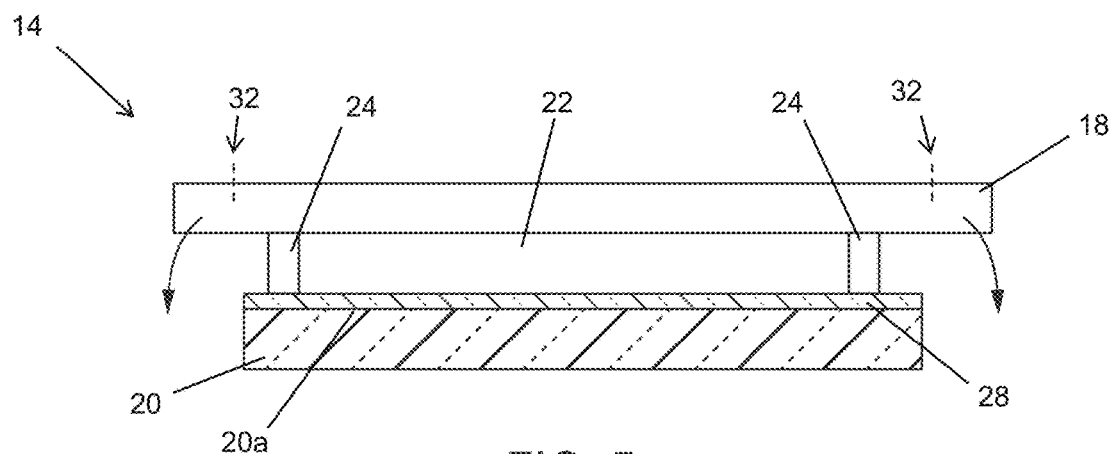
FIG. 5 is a sectional view of the mirror reflective element before the front glass substrate has been formed from the glass sheet.

The geometries of the front and rear glass substrates of the frameless mirror reflective elements (with the front substrate being larger than the rear substrate and with no part of the rear substrate extending beyond any part of the front substrate) allow for the front glass substrate 18 or shape to be finalized after completion of the EC process (the process of creating a sealed cavity between the substrates and filling the cavity with an electrochromic medium). Such a frameless mirror cell can now be manufactured out of a plate of glass after the rest of the EC manufacturing process is complete, since the perimeter of the larger front glass shape can be cut out after the cell is formed without affecting the smaller rear glass shape. In the case of a traditional scoring cut machine, the front glass can be broken away at score marks 32 because it is unobstructed by the rear glass substrate (as shown via the break-away arrows and the score marks 32 in FIG. 5). If a laser is used to cut the glass, the front substrate can be laser cut without concern of damaging the rear substrate and/or the coating at the third surface of the rear substrate.

Figure 6:
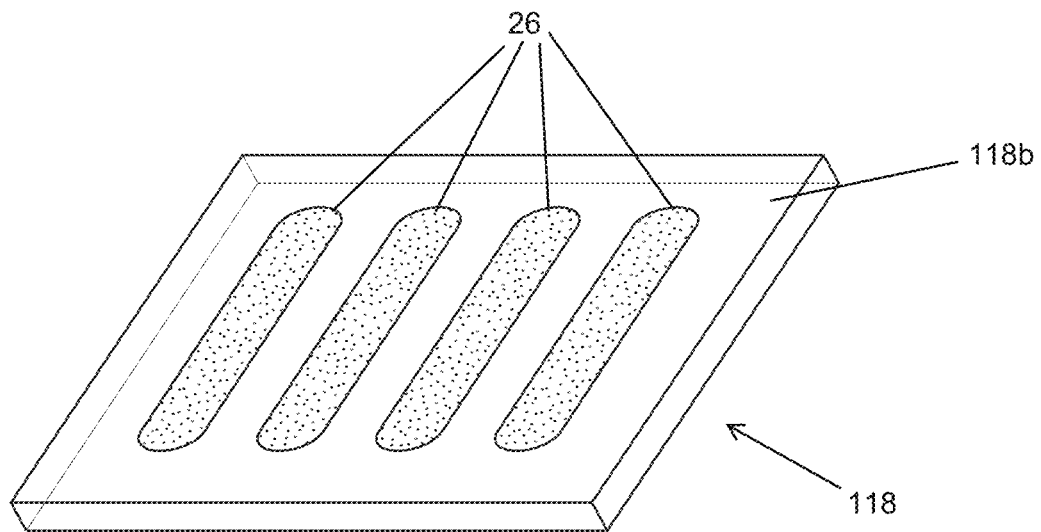
FIG. 6 is a perspective view of a glass sheet suitable for forming a plurality of front glass substrates.
Figure 7:
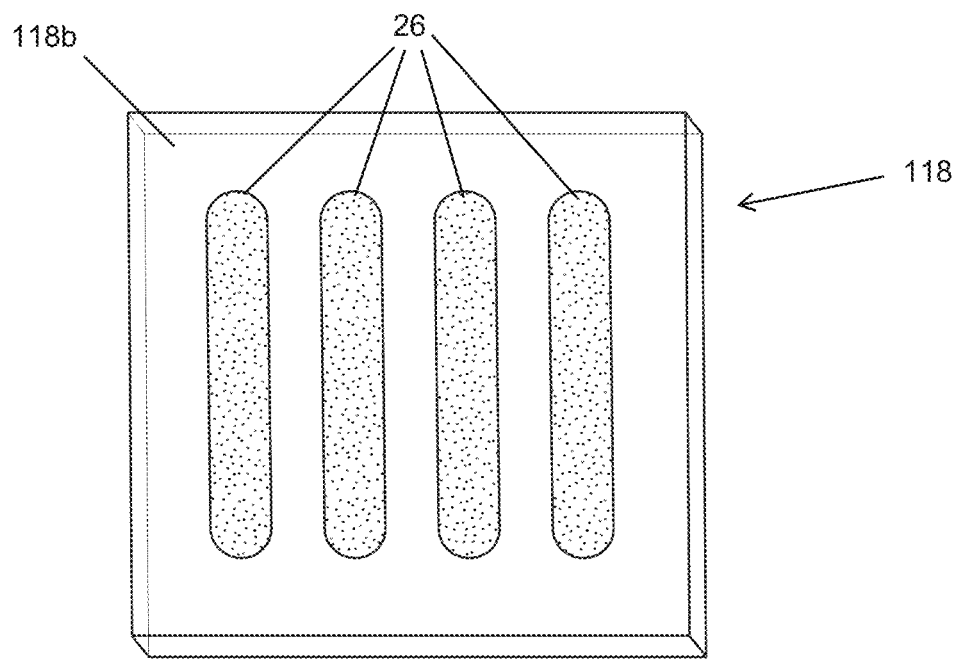
FIG. 7 is a perspective view of the glass sheet of FIG. 6.

Because the rear glass substrates of frameless mirrors do not extend beyond any part of the front glass substrates, and thus the manufacturing and/or glass cutting techniques applied to the front glass substrate do not interfere with the rear glass substrate, multiple glass mirror substrates may be made at one time in a plate type of approach on a sheet of glass that eventually forms the front glass substrates. As shown in FIG. 6, a glass sheet 118 or plate having the thickness desired for a front glass substrate, such as 2 mm or 2.5 mm (to allow for a curved or rounded front perimeter edge having a radius of curvature of at least 2.5 mm to be formed after the front glass shapes are cut from the sheet) is coated at its rear surface 118b, with masked areas to create openings for EC glass.

Referring to FIGS. 6-9, the plate is not cut until the entire or a significant portion of the EC cell forming process is completed. In other words, and such as shown in FIG. 6, the front glass plate 118 is coated at its rear surface 118b (which will form the rear or second surface of the front glass substrate when the mirror cell is complete) and the rear glass substrates 20 are formed (cut from another glass sheet) and coated at their front or third surfaces 20a. The cut and coated rear glass substrates 20 are adhered to the already coated front glass plate 118 (via the sealing material that forms the perimeter seal of the EC cell and that defines the interpane cavity between the glass substrates) at appropriate locations on the plate 118 corresponding to what will become front glass substrates, with the perimeter seals 24 adhering the respective rear substrates 20 to the plate 118 (see FIG. 8). The locations on the plate 118 corresponding to front glass substrates can be seen in FIGS. 6 and 7 via the placement of the coating 26 at the rear surface 118*b* of the plate 118 (however, to ease the assembly process, the entire rear surface of the plate may be coated with the transparent electrically conductive coating).

The interpane cavities of the respective cells (the cavities between the second surface 118*b* of the glass sheet and the third surface of the respective rear substrates 20 that are bounded by the respective perimeter seals 24) can be filled with the electro-optic medium 22 and sealed before the glass plate 118 is cut to form the front glass substrates or shapes, such as by utilizing aspects of the processes described in U.S. Pat. No. 7,255,451, which is hereby incorporated herein by reference in its entirety. This provides a significant advantage for manufacturing, allowing standardization of many different shapes of mirrors that originate from a single plate design. For example, cutting multiple glass substrates from a single plate of glass allows a manufacturer to alter the designs cut from a single plate. A variety of frameless mirror shapes can originate from the same glass plate or the same plate may be used to manufacture multiple mirrors of the same shape at the same time. This allows for flexibility in the manufacturing process to more readily adapt output to demand.

The process of the present invention reduces handling damage as well as reduces complexity in tooling and automation. The process improves the accuracy of the part masking and allows for a single datum scheme to be carried through each process step to make the electrochromic mirror cell. By using a consistent datum scheme, the variation due to location can be greatly minimized. The datum can originate in many ways, such as by using the edges of the plate, laser markings in either the raw or coated glass or even with holes drilled in non-critical areas of the glass plate or other means as well to assure accurate and repeatable locations during the EC cell forming process or operations. Datum schemes for the manufacturing processes of different embodiments or shapes or styles of frameless mirrors may differ to provide custom or specific datum schemes for that particular frameless mirror. Optionally, datum schemes may be kept consistent between the manufacturing processes of different frameless mirrors to provide consistent reference points and operation of the tooling. In either situation, providing a consistent datum scheme throughout multiple stages of manufacturing the mirror cell at the plate or front glass substrate provides a significantly more accurate and consistent reference point for the tooling operation.

Creating the mirror cells utilizing a glass plate 118 or blank allows for the part to be manufactured with minimal contact at the eventual "class A" surface (the exposed front surface 18*a* and front perimeter edge 18*c* regions of the front glass substrate 18). This directly influences the quality and yield of the manufacturing process in a positive manner. The final "class A" edge and surface can be created as the last or nearly the last step in the EC cell forming/assembling process. Thus, the manufacturing process will provide fewer opportunities for the "class A" surface or edge to be scratched, scuffed, cracked, chipped, or otherwise damaged.

Figure 8:
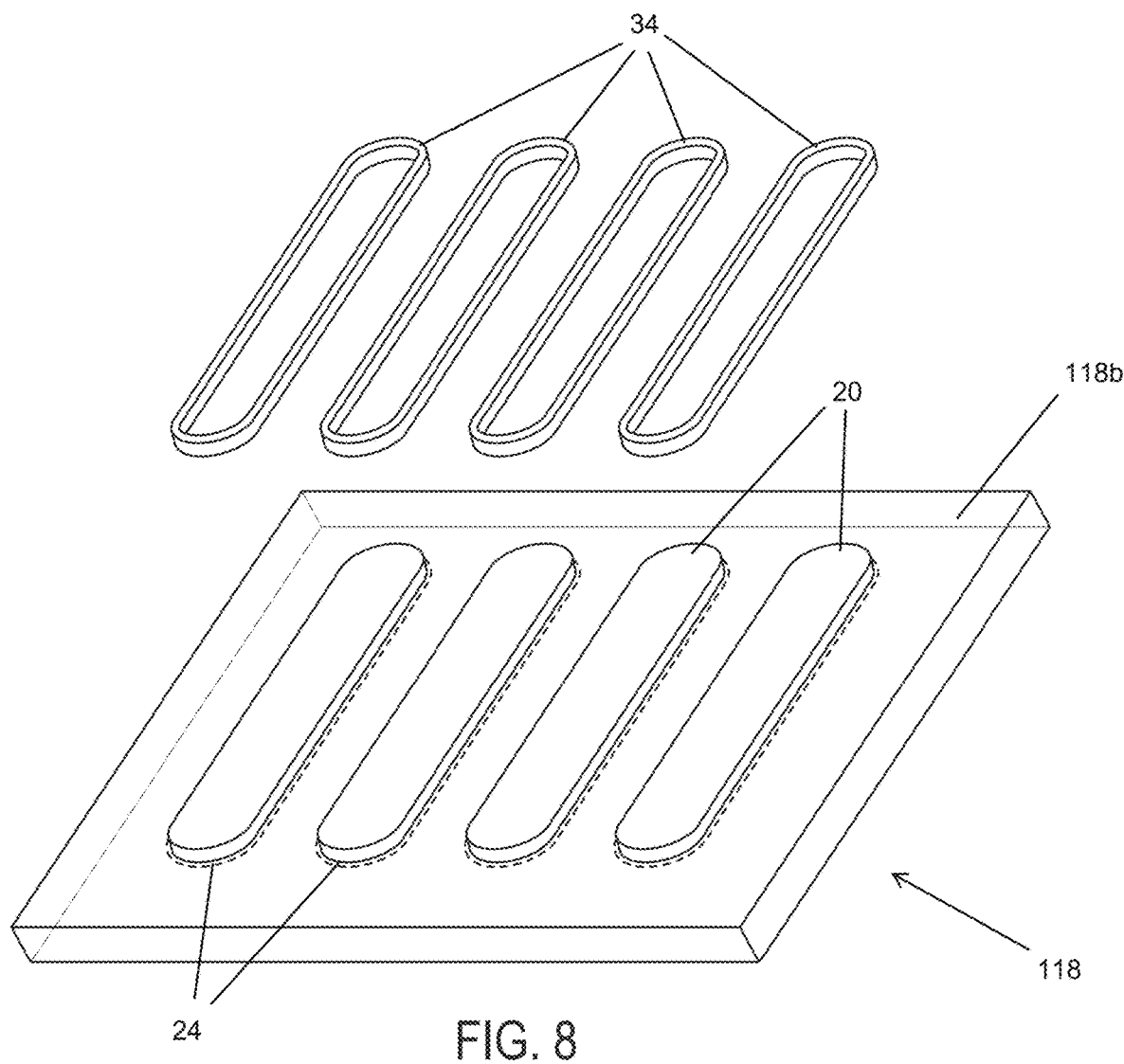
FIG. 8 is a perspective view of the glass sheet for forming a plurality of front glass substrates, shown with a plurality of rear glass substrates adhered to the glass sheet, and with a plurality of mirror back plates being attached at the rear of the rear glass substrates.
Figure 9:
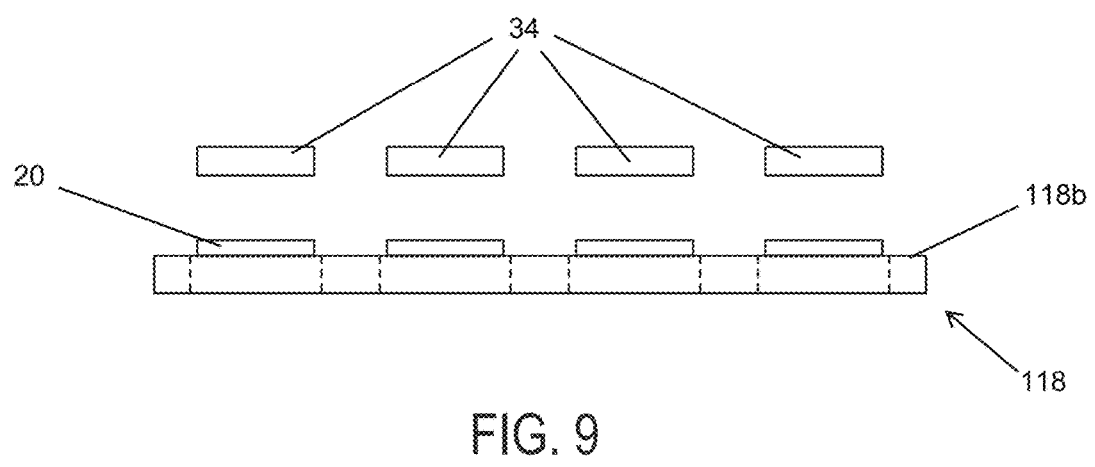
FIG. 9 is a side elevation view of the glass sheet with rear glass substrates and mirror back plates of FIG. 8.
Figure 10:
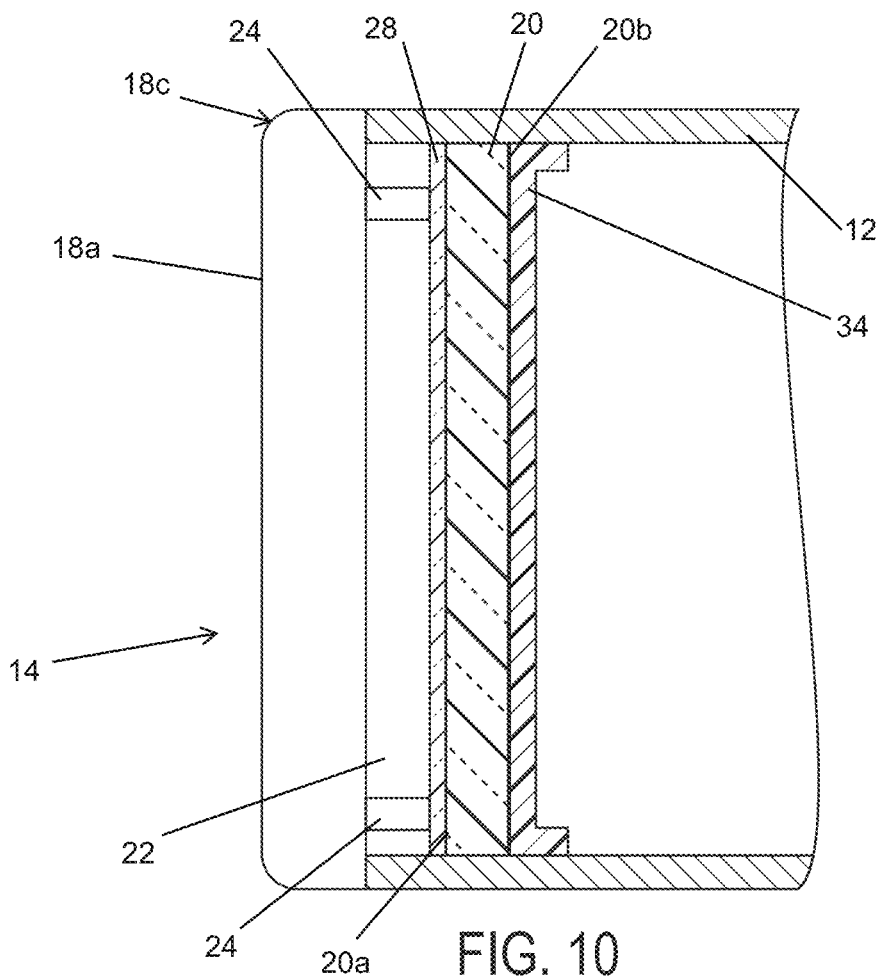
FIG. 10 is a sectional view of a mirror assembly, where the finished mirror cell is attached at a mirror casing.

Optionally, given that manufacturing multiple frameless mirrors utilizing a singular plate provides much improved position accuracy, the attachment feature 34 for the mirror cell 14 to the housing 12 (typically referred to as the back plates) can be attached to the rear substrates 20 before the mirror shape is cut from the plate 118 (see FIGS. 8 and 9). By affixing or adhering the back plate 34 to the mirror cells before the front substrate is cut from the glass plate 118, the assembly costs can be reduced. Also, the back plate 34 will be precisely located and aligned relative to the cut edge of the glass, which is beneficial in assuring that the final product assembles to the mirror casing 12 with minimal misalignment between the glass and the mirror casing (see FIG. 10). The fit of the rear glass substrate to the housing may also be improved by such a process.

Additionally, for frameless mirrors, the front glass shapes or substrates 18 cut from the plate may require post-cut treatment of the edges (such as grinding and polishing the perimeter edge to provide the rounded periphery). The back plate 34 can be designed to serve as a locating and clamping feature, which will allow the grinding and polishing operations to be more readily automated, with the mirror cell (and front substrate that is to be ground/polished) being precisely held in its location during the grinding and polishing operations. This is an improvement over the grinding and polishing of individual shapes or substrates, which are held via a vacuum attachment or a mechanical clamp directly attached to the glass substrate, which can allow a part to slip or move slightly during the grinding/polishing, resulting in damage or defect and ultimately having to scrap the substrates. By first permanently attaching the back plate or attachment plate 34 at the rear surface 20*b* of the rear substrate 20 (such as via adhesive or double-sided tape or the like), such that the formed cell has the back plate affixed thereto before the grinding/polishing processes (and before the front glass substrate is even cut or broken from the larger glass sheet), the back plate can be securely held at a fixture of the finishing tool to substantially preclude or prevent any movement of the front glass substrate during the grinding/polishing processes. Such a feature thus can allow for higher machining (grinding and polishing) speeds as such an arrangement can withstand higher loads and forces applied to the glass substrate without causing movement of the substrate that is being ground/polished. This approach increases the precision of the location of the finished edge of the glass substrate and uses the attachment feature used to assemble the mirror to the housing to fixture and hold the mirror cell and front glass substrate securely in place during the finishing processes.

Optionally, the above described processes may also be suitable for bent glass shapes (such as for exterior rearview mirror assemblies), where a bent glass blank or sheet is utilized throughout the EC cell forming process and the final glass shape is created as the final process (by cutting the front glass blank to the desired front glass shapes at the end of the process).

Figure 11:
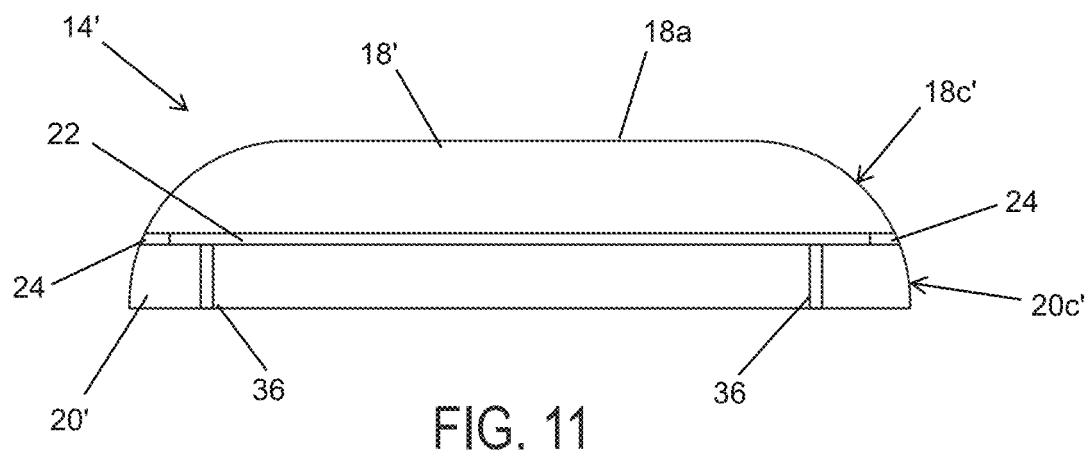
FIG. 11 is a sectional view of another mirror reflective element, with the front and rear substrates cut from sheets and with their perimeter edges finished together to form the desired rounded or curved periphery of the mirror reflective element.

The assembly process is also suitable for use in manufacturing mirror cells 14' (FIG. 11) where electrical connections of the anode and cathode to the respective electrically conductive coatings at the respective surfaces of the glass substrates are made through the rear glass substrate 20' (such as by vias or passageways 36 formed through the rear glass substrate 20'). With such a design, the front and rear substrates 18', 20' may be formed with the same profile, and optionally may both be ground and polished (via a common process that grinds and/or polishes both substrates together) to provide a curved or rounded periphery around the mirror cell. Thus, the curvature of the cut edge 18c' of the front glass substrate 18' aligns with or coincides with or corresponds to the curvature of the cut edge 20c' of the rear glass substrate 20' to achieve a common profile. In such an application, the mirror substrates can be thinner (i.e., the front glass sheet need not be 2 mm or 2.5 mm thick since the rounded perimeter edge is formed by both the front and rear substrates) and can be cut and machined together (because the rear substrate has the same profile or radius of curvature of the rounded perimeter edge as that of the front substrate) to create the surface edge that appears to be a single piece of glass, but is actually made from two pieces of glass laminated together. This mirror cell construction may be thinner and lighter than other configurations.

Figure 12:
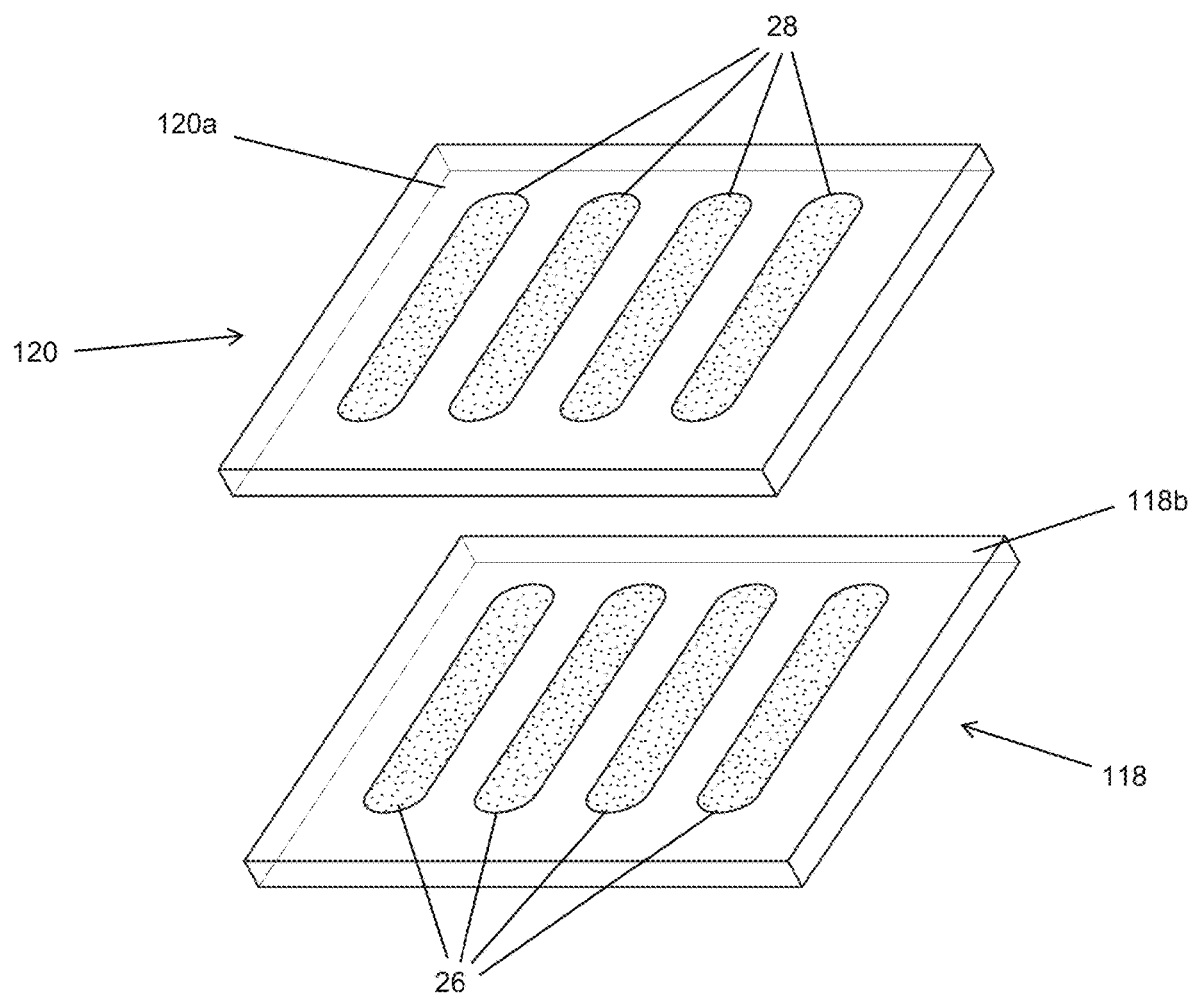
FIG. 12 is an exploded perspective view showing a coated glass sheet for the front shapes or substrates and a coated glass sheet for the rear shapes or substrates.

Referring to FIG. 12, when the front and rear substrates share a common profile, both the front and rear glass can be formed from glass plates. This allows for greater gains in the manufacturing processes. The mirror shapes can be extracted or formed from the dual plate process at or near the end of the cell forming process, further increasing the precision and reducing the handling damage to the "class A" surface of the final mirror cell.

Thus, the manufacturing steps of the process described herein are followed substantially, but instead of placing rear glass substrates at the front glass plate 118, a rear glass plate 120, from which multiple rear glass substrates will be extracted, is disposed at and adhered or bonded to via a plurality of perimeter seals disposed at one of the opposing surfaces of the glass plates or sheets. As shown in FIG. 12, both the front plate 118 and the rear plate 120 may be coated (such as with a transparent conductive coating 26 at the rear surface 118b of the front plate 118 and a metallic reflector coating 28 at the front surface 120a of the rear plate 120) and then adhered to one another via the perimeter seals. For illustrative purposes, FIG. 12 depicts the coated surfaces of the front and rear plates as both facing upwards, but it should be understood that when joined, the coated surfaces face one another (such as in FIGS. 2 and 3).

After the perimeter seal is applied (to either of the opposing surfaces and around the respective interpane cavity to be formed) to adhere the front glass plate to the rear glass plate, additional manufacturing steps may take place (such as curing the perimeter seal material, filling the interpane cavity with the electro-optic medium, plugging the fill hole through the perimeter seal, and/or affixing the back plate at the rear glass plate via curing or bonding the perimeter seal at the plates) before the individual mirror cells are cut from the glass plates. After the mirror cells are cut from the front and rear glass plates, the perimeter edges of both the front and rear glass are ground and polished together to produce a curved or rounded periphery edge around the cell. Thus, the process where both the front glass substrate and the rear glass substrate originate from glass plates after the plates are joined or mated together via the perimeter seals provides a method for producing mirror cells (such as those in FIG. 11) where the front and glass substrate are formed with the same profile, share a peripheral edge, and thus appear to be formed from a single piece of glass and can also be made thinner and lighter than other mirror assemblies. Optionally, the process may also be suitable for mirror cells that have front and rear substrates with non-matching perimeter edges.

Therefore, the present invention provides a process of forming an electrochromic mirror cell using a glass sheet for the front glass substrate during the forming process, with the step of cutting or forming the front glass shape being one of the last steps in the process, after the cell is formed and filled. The process comprises starting with a sheet of glass (such as, for example, a glass sheet having a thickness dimension of at least 2 mm, such as 2.5 mm or thereabouts) and coating the sheet of glass and positioning multiple rear glass substrates (already cut or formed) at the coated surface and adhering the rear glass substrates to the sheet via the respective perimeter seals of the respective cells. The mirror shapes or front substrates are then cut from the sheet, resulting in individual mirror cells. The cells may be filled while part of the sheet, or may be filled later, after the front substrates are cut from the sheet. After the front substrates or shapes are cut from the sheet, the perimeter edge of the front substrates are ground and/or polished to provide the finished perimeter edge (such as a rounded edge having a radius of curvature of at least 2.5 mm). Optionally, the back plates may be attached at the rear substrates (attached at the front glass sheet) prior to cutting the front glass substrates from the front glass sheet, or the back plates may be attached at the rear substrates after cutting the front glass substrates from the front glass sheet but before the grinding and polishing steps that finish the perimeter edge and surface of the front glass substrate. Optionally, the back plates may be attached at the rear glass substrates (or at the rear glass sheet) before the rear glass sheet or substrates are attached at the front glass sheet (such that the back plate may be used to position the rear glass substrate or sheet at the appropriate location relative to the front glass sheet). Optionally, the front glass sheet may be thinner and the rear glass substrate and front glass substrate, when combined and after being cut from the glass sheet, may be machined or processed together to provide the rounded perimeter edge of the mirror reflective element.

Optionally, the rear glass substrates may be applied to the front glass sheet or plate as a rear glass sheet or plate, where both front and rear shapes may be extracted from the plates near the end of the manufacturing process (e.g., after filling the interpane cavities with the electrochromic medium). Thus, when the rear glass substrates comprise a rear glass sheet, at least the rear glass substrate regions are coated and the rear glass sheet is adhered at the coated surface of the front glass substrate via a plurality of perimeter seals. The mirror cells are filled with the electro-optic medium and the mirror shapes are cut from the front and rear glass sheets. The perimeter edge of the front and rear glass substrates are ground and polished together to provide a finished perimeter edge. The back plates are attached at the rear substrates either before or after cutting the shapes from the sheets and either before or after grinding and polishing the perimeter edges of the cut glass substrates. Attaching the back plates prior to cutting the shapes and/or grinding and polishing the perimeter edge allows the back plate to be used as a clamping point in the grinding and polishing and finishing process or processes.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Optionally, the reflective element may include an opaque or substantially opaque or hiding perimeter layer or coating or band disposed around a perimeter edge region of the front glass substrate (such as at a perimeter region of the rear or second surface of the front glass substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties. The hiding layer is applied at the surface of the glass sheet before the rear glass substrates (or rear glass sheet) are attached at the front glass sheet during the EC cell forming process.

The back plate may comprise any suitable construction (such as formed via injection molding a plastic or polymeric resin or material). Optionally, for example, a common or universal back plate, whereby the appropriate or selected socket element or pivot element (such as a socket element or such as a ball element or the like) is attached to the back plate to provide the desired pivot joint for the particular mirror head in which the back plate is incorporated. Optionally, when molding the back plate (such as via injection molding the plastic or polymeric resin or material), a different insert may be provided to integrally mold a portion of or all of a ball member or the like (such as a portion of a base of a ball member, whereby the ball member may comprise a metallic ball member that is insert molded at the base and at the rear of the back plate during the injection molding process that forms the back plate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

Changes and modifications in the specifically described embodiments may be carried out without departing from the principles of the present invention, which is intended to be limited only by the scope of the appended claims as interpreted according to the principles of patent law.

The invention claimed is:

1. A method of manufacturing a variable reflectance mirror reflective element suitable for use in a vehicular rearview mirror assembly, the method comprising:
providing a front glass sheet having a first surface and a second surface separated by a thickness of the front glass sheet;
disposing a transparent electrically conductive layer at the second surface of the front glass sheet;
providing a plurality of rear glass substrates, wherein each rear glass substrate of the plurality of rear glass substrates has a third surface and a fourth surface separated by a thickness of the respective rear glass substrate;
disposing a mirror reflector at the third surface of each rear glass substrate;
joining and spacing the plurality of rear glass substrates with the front glass sheet at front glass substrate portions of the front glass sheet via respective perimeter seals, each perimeter seal establishing an interpane cavity between the third surface of the respective rear glass substrate and the second surface of the front glass sheet at the respective front glass substrate portion;
after the plurality of rear glass substrates are joined with the front glass sheet and with the interpane cavities established between the third surface of the respective rear glass substrates and the second surface of the respective front glass substrate portions and bounded by the respective perimeter seals, disposing an electrochromic medium in the interpane cavities;
after the plurality of rear glass substrates are joined with the front glass sheet, cutting the front glass sheet at the front glass substrate portions of the front glass sheet to form a plurality of front glass substrates, each having a respective rear glass substrate joined therewith via a respective perimeter seal;
attaching back plates at the rear of respective rear glass substrates;
after cutting the front glass sheet at the front glass substrate portions to form the plurality of front glass substrates having the respective rear glass substrates joined therewith via the respective perimeter seals, fixturing one of the back plates at a finishing tool; and
using the finishing tool, and with the back plate fixtured at the finishing tool and attached at the respective rear glass substrate, processing the cut edges of at least the respective front glass substrate to provide a finished perimeter edge of the respective front glass substrate to form a variable reflectance mirror reflective element.

2. The method of claim 1, wherein attaching the back plates at the rear of the respective rear glass substrates is performed after the plurality of rear glass substrates are joined with the front glass sheet.

3. The method of claim 2, wherein attaching the back plates at the rear of the respective rear glass substrates is performed before the step of cutting the front glass sheet at the front glass substrate portions to form the plurality of front glass substrates.

4. The method of claim 1, wherein attaching the back plates at the rear of the respective rear glass substrates is performed before the plurality of rear glass substrates are joined with the front glass sheet.

5. The method of claim 1, wherein, with the plurality of rear glass substrates joined with the front glass sheet, no part of each rear glass substrate extends beyond a perimeter of the respective front glass substrate portion of the front glass sheet.

6. The method of claim 1, wherein the front glass sheet has a thickness dimension of at least 2 mm.

7. The method of claim 6, wherein the processed cut edge of the front glass substrate provides a finished rounded perimeter edge having a radius of curvature of at least 2.5 mm.

8. The method of claim 1, wherein the step of disposing the electrochromic medium in the interpane cavities is performed after cutting the front glass sheet at the front glass substrate portions to form the plurality of front glass substrates.

9. The method of claim 1, wherein the step of disposing the electrochromic medium in the interpane cavities is performed before cutting the front glass sheet at the front glass substrate portions to form the plurality of front glass substrates.

10. The method of claim 1, wherein the finishing tool comprises a grinding and/or polishing tool that grinds and/or polishes the cut edges of at least the front glass substrates.

11. The method of claim 1, wherein the finishing tool comprises a grinding and/or polishing tool that grinds and/or polishes the cut edges of both the front glass substrate and the rear glass substrate during a common grinding and/or polishing operation.

12. The method of claim 1, comprising disposing a hiding layer at the coated second surface of the front glass sheet at a perimeter region of each respective front glass substrate portions, wherein the hiding layer comprises an electrically conductive reflective hiding layer, and wherein, with the plurality of rear glass substrates joined with the front glass sheet, the hiding layer conceals the perimeter seal from view through the front glass sheet.

13. The method of claim 1, wherein the plurality of rear glass substrates are part of a rear glass sheet, and wherein each rear glass substrate of the plurality of rear glass substrates comprises a rear glass substrate portion of the rear glass sheet, and wherein the method further comprises cutting the rear glass sheet to form the plurality of rear glass substrates.

14. A method of manufacturing a variable reflectance mirror reflective element suitable for use in a vehicular rearview mirror assembly, the method comprising:
providing a front glass sheet having a first surface and a second surface separated by a thickness of the front glass sheet;
disposing a transparent electrically conductive layer at the second surface of the front glass sheet;
providing a plurality of rear glass substrates, wherein each rear glass substrate of the plurality of rear glass substrates has a third surface and a fourth surface separated by a thickness of the respective rear glass substrate;
disposing a mirror reflector at the third surface of each rear glass substrate;
joining and spacing the plurality of rear glass substrates with the front glass sheet at front glass substrate portions of the front glass sheet via respective perimeter seals, each perimeter seal establishing an interpane cavity between the third surface of the respective rear glass substrate and the second surface of the front glass sheet at the respective front glass substrate portion;
wherein, with the plurality of rear glass substrates joined with the front glass sheet, no part of each rear glass substrate extends beyond a perimeter of the respective front glass substrate portion of the front glass sheet;
after the plurality of rear glass substrates are joined with the front glass sheet and with the interpane cavities established between the third surface of the respective rear glass substrates and the second surface of the respective front glass substrate portions and bounded by the respective perimeter seals, disposing an electrochromic medium in the interpane cavities;
after the plurality of rear glass substrates are joined with the front glass sheet, attaching back plates at the rear of respective rear glass substrates;
after the plurality of rear glass substrates are joined with the front glass sheet, cutting the front glass sheet at the front glass substrate portions of the front glass sheet to form a plurality of front glass substrates, each having a respective rear glass substrate joined therewith via a respective perimeter seal;
after cutting the front glass sheet at the front glass substrate portions to form the plurality of front glass substrates having the respective rear glass substrates joined therewith via the respective perimeter seals, fixturing one of the back plates at a finishing tool; and
using the finishing tool, and with the back plate fixtured at the finishing tool and attached at the respective rear glass substrate, processing the cut edges of at least the respective front glass substrate to provide a finished perimeter edge of the respective front glass substrate to form a variable reflectance mirror reflective element.

15. The method of claim 14, wherein attaching the back plates at the rear of the respective rear glass substrates is performed before the step of cutting the front glass sheet at the front glass substrate portions to form the plurality of front glass substrates.

16. The method of claim 14, wherein the front glass sheet has a thickness dimension of at least 2 mm, and wherein the processed cut edge of the front glass substrate provides a finished rounded perimeter edge having a radius of curvature of at least 2.5 mm.

17. The method of claim 14, wherein the step of disposing the electrochromic medium in the interpane cavities is performed after cutting the front glass sheet at the front glass substrate portions to form the plurality of front glass substrates.

18. The method of claim 14, wherein the step of disposing the electrochromic medium in the interpane cavities is performed before cutting the front glass sheet at the front glass substrate portions to form the plurality of front glass substrates.

19. The method of claim 14, wherein the finishing tool comprises a grinding and/or polishing tool that grinds and/or polishes the cut edges of at least the front glass substrates.

20. The method of claim 14, wherein the finishing tool comprises a grinding and/or polishing tool that grinds and/or polishes the cut edges of both the front glass substrate and the rear glass substrate during a common grinding and/or polishing operation.

21. A method of manufacturing a variable reflectance mirror reflective element suitable for use in a vehicular rearview mirror assembly, the method comprising:
providing a front glass sheet having a first surface and a second surface separated by a thickness of the front glass sheet;
disposing a transparent electrically conductive layer at the second surface of the front glass sheet;
disposing a hiding layer at the coated second surface of the front glass sheet at a perimeter region of each of a plurality of front glass substrate portions of the front glass sheet, wherein the hiding layer comprises an electrically conductive reflective hiding layer;
providing a plurality of rear glass substrates, wherein each rear glass substrate of the plurality of rear glass substrates has a third surface and a fourth surface separated by a thickness of the respective rear glass substrate;
disposing a mirror reflector at the third surface of each rear glass substrate;
joining and spacing the plurality of rear glass substrates with the front glass sheet at the front glass substrate portions of the front glass sheet via respective perimeter seals, each perimeter seal establishing an interpane cavity between the third surface of the respective rear glass substrate and the second surface of the front glass sheet at the respective front glass substrate portion;

wherein, with the plurality of rear glass substrates joined with the front glass sheet, the hiding layers conceal the respective perimeter seals from view through the front glass sheet;

wherein, with the plurality of rear glass substrates joined with the front glass sheet, no part of each rear glass substrate extends beyond a perimeter of the respective front glass substrate portion of the front glass sheet;

after the plurality of rear glass substrates are joined with the front glass sheet and with the interpane cavities established between the third surface of the respective rear glass substrates and the second surface of the respective front glass substrate portions and bounded by the respective perimeter seals, disposing an electrochromic medium in the interpane cavities;

after the plurality of rear glass substrates are joined with the front glass sheet, cutting the front glass sheet at the front glass substrate portions of the front glass sheet to form a plurality of front glass substrates, each having a respective rear glass substrate joined therewith via a respective perimeter seal;

adhesively attaching back plates at the rear of respective rear glass substrates;

after cutting the front glass sheet to form the plurality of front glass substrates having the respective rear glass substrates joined therewith via the respective perimeter seals, fixturing one of the back plates at a finishing tool;

using the finishing tool, and with the back plate fixtured at the finishing tool and attached at the respective rear glass substrate, processing the cut edges of at least the respective front glass substrate to provide a finished perimeter edge of the respective front glass substrate to form a variable reflectance mirror reflective element; and wherein the finishing tool comprises a grinding and/or polishing tool that grinds and/or polishes the cut edges of at least the respective front glass substrate.

22. The method of claim 21, wherein adhesively attaching the back plates at the rear of the respective rear glass substrates is performed after the plurality of rear glass substrates are joined with the front glass sheet.

23. The method of claim 22, wherein adhesively attaching the back plates at the rear of the respective rear glass substrates is performed before the step of cutting the front glass sheet at the front glass substrate portions to form the plurality of front glass substrates.

24. The method of claim 21, wherein adhesively attaching the back plates at the rear of the respective rear glass substrates is performed before the plurality of rear glass substrates are joined with the front glass sheet.

25. The method of claim 21, wherein the front glass sheet has a thickness dimension of at least 2 mm, and wherein the processed cut edge of the front glass substrate provides a finished rounded perimeter edge having a radius of curvature of at least 2.5 mm.

26. The method of claim 21, wherein the step of disposing the electrochromic medium in the interpane cavities is performed after cutting the front glass sheet at the front glass substrate portions to form the plurality of front glass substrates.

27. The method of claim 21, wherein the step of disposing the electrochromic medium in the interpane cavities is performed before cutting the front glass sheet at the front glass substrate portions to form the plurality of front glass substrates.

* * * * *